Jan. 10, 1956  A. L. RANGE ET AL  2,730,709
MEASURING APPARATUS

Filed Nov. 12, 1952  2 Sheets-Sheet 1

INVENTORS
ARTHUR L. RANGE
JOHN C. STEVENS
MARCUS LEUPOLD
BY Buckhorn and Cheatham

ATTORNEYS

Jan. 10, 1956   A. L. RANGE ET AL   2,730,709
MEASURING APPARATUS
Filed Nov. 12, 1952   2 Sheets-Sheet 2
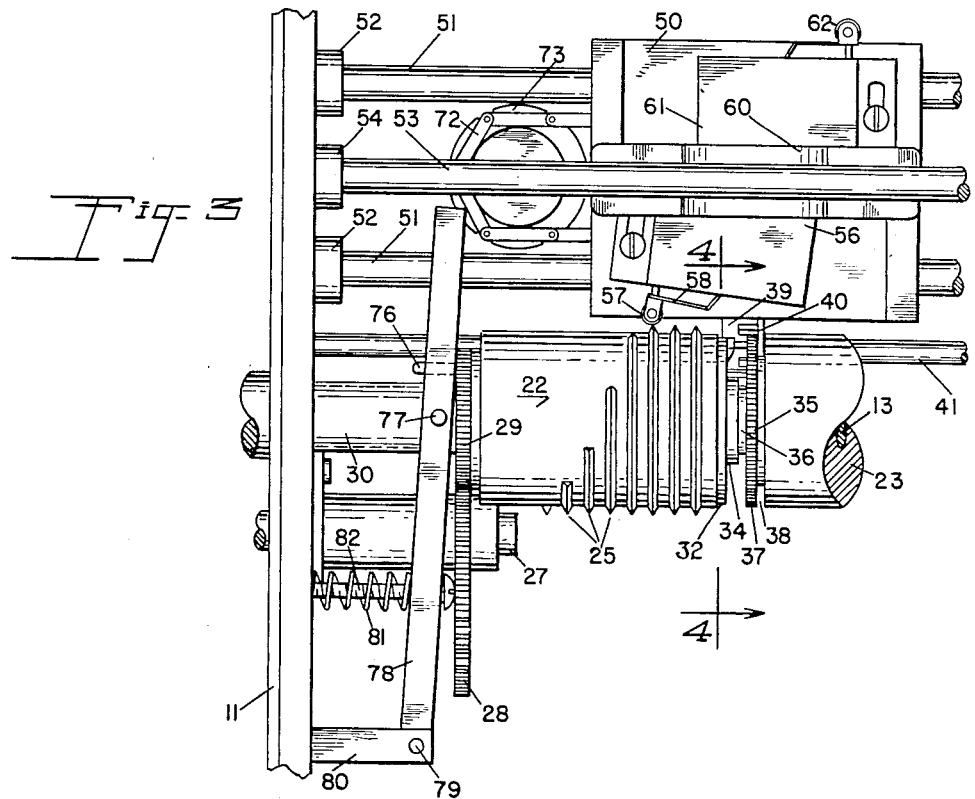
Fig. 3
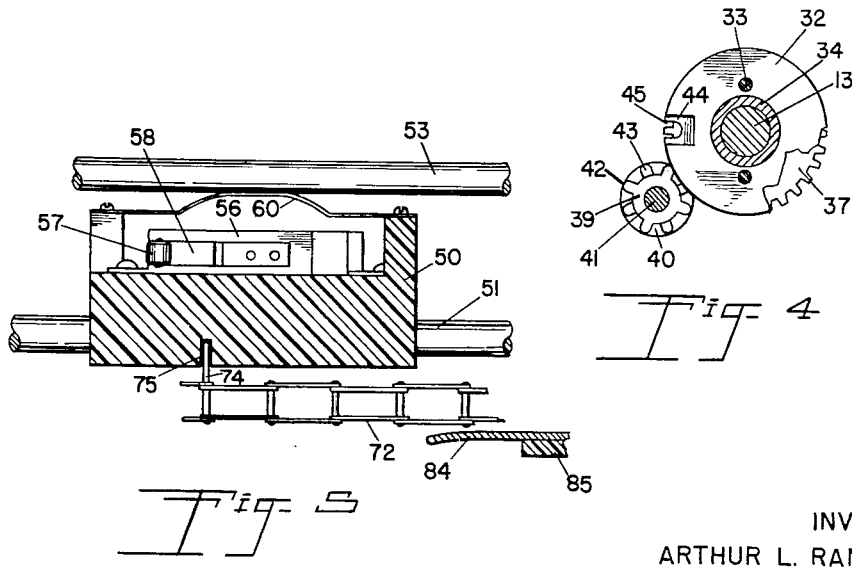
Fig. 4
Fig. 5
INVENTORS
ARTHUR L. RANGE
JOHN C. STEVENS
MARCUS LEUPOLD
BY
Duckhorn and Cheatham
ATTORNEYS United States Patent Office 2,730,709
Patented Jan. 10, 1956

2,730,709

MEASURING APPARATUS

Arthur L. Range, John C. Stevens, and Marcus Leupold, Portland, Oreg., assignors to Leupold & Stevens Instruments, Inc., Portland, Oreg., a corporation of Oregon Application November 12, 1952, Serial No. 319,854

2 Claims. (Cl. 340—345)

The present invention comprises a machine for measuring a measurable condition and transmitting data concerning the condition to a distant point. The present invention is of particular utility in activities concerning the water level of streams, lakes and reservoirs, such as flood control surveys, hydroelectric projects and irrigation projects. The specific embodiment of the present invention illustrated herein comprises a sheave with which is to be associated a cable and float device for measuring the level of a body of water, such as in a quiet well alongside of a stream, reservoir or lake, but it is to be appreciated that the present invention may be modified to transmit intelligence concerning any measurable condition.

The present invention comprises an improvement upon the apparatus disclosed and claimed in the patent to Stevens, No. 2,146,999, issued February 14, 1939, and has for one of its objects the simplification of mechanical portions of the apparatus set forth in the aforesaid patent.

A further object of the present invention is to provide means which may be readily adapted for varying conditions. For example, the present invention may be set to transmit intelligence in units of one foot of water level, or one-tenth, or one-hundredth thereof; and the present invention may be adapted to transmit intelligence in digits only, or in figures of two, three, four or more digits.

A further object of the present invention is to provide a machine of the character described which includes a totalizing mechanism comprising a plurality of drums rotatively mounted in end-to-end relation on a shaft, and totalizer means cooperatively associated with adjacent drums for transferring data from drum to drum, in which a first one of said drums is connected to measuring mechanism and driven thereby and in which said shaft constantly rotates relative to all of said drums whereby to prevent any tendency for any one of the drums to stick to the shaft. The foregoing is of importance since many such instruments are placed in relatively inaccessible locations in high mountains and may be visited only for annual servicing.

A further object of the present invention is to provide means of the foregoing character in which data is accumulated on a plurality of longitudinally aligned coding drums operatively associated with a measuring mechanism, and the data sensed when desired by means of a sensing element moving longitudinally of all of the drums, and in which means are provided to prevent rotation of the drums during the time that the sensing element is traversing the drums whereby to protect the relatively delicate sensing element from damage.

The objects and advantages of the present invention may be more readily understood by reference to the accompanying drawings taken in connection with the following specification wherein like numerals refer to like parts throughout.

In the drawings,

Fig. 3 is an enlarged, partial plan view showing the apparatus in the act of sensing accumulated data;

Fig. 4 is a vertical section taken substantially along line 4—4 of Fig. 3; and

Fig. 5 is a vertical section taken substantially along line 5—5 of Fig. 2.

Figure 1:
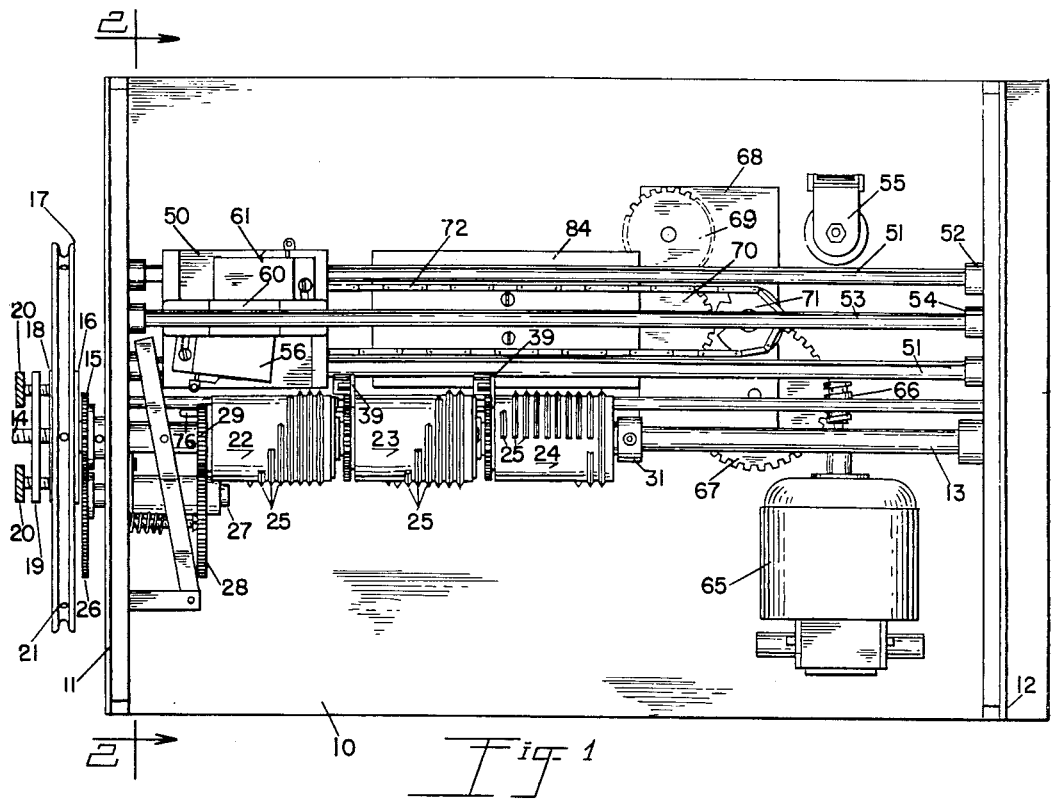
Fig. 1 is a plan view of the principal mechanical elements of a machine embodying the present invention, the electrical circuits such as in signaling apparatus associated therewith being omitted.
Figure 2:
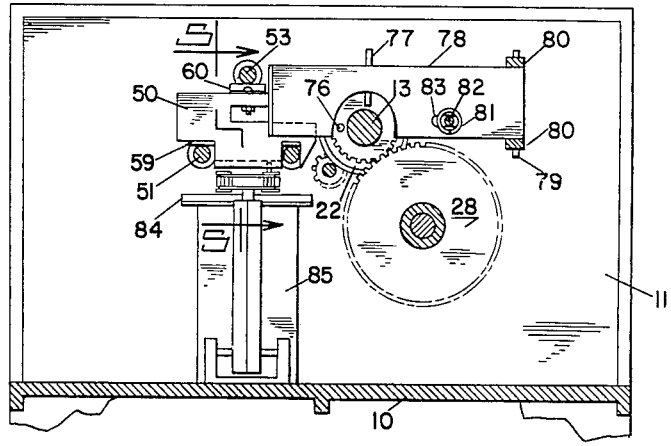
Fig. 2 is a vertical section taken substantially along line 2—2 of Fig. 1.

The invention comprises a base 10 having opposed end walls 11 and 12 thereon adapted to support a cover (not shown) including a top and attached side walls adapted to form with the end walls and the base a complete enclosure for the delicate portions of the mechanism. An elongated shaft 13 is removably mounted in suitable journals in the end walls 11 and 12, the shaft having a threaded end portion 14 projecting beyond the wall 11. A driving gear 15 is fixed to the shaft 13 outside of the wall 11 and has an inner friction plate 16 fixed thereto. A measuring sheave 17 is loosely mounted on the shaft 13 and an outer friction plate 18 bears against its outer surface. A plate 19 is threadedly mounted on the threaded portion 14 and carries a pair of screws 20, the inner ends of which bear against the outer friction plate 18 in diametrically opposed relation. The sheave 17 is preferably provided with a plurality of recesses 21 for association with accurately located beads on a measuring cable (not shown) with which may be associated a water level indicator float or other means for measuring a given condition. The base is installed on a suitable support, and the cable associated with the sheave when the sheave is in free-wheeling condition achieved by loosening the screws 20. The immediate value of the condition to be measured is manually imposed upon the totalizer drums to be described, and the sheave is then locked to the shaft 13 by tightening the screws 20.

The totalizer means comprises a plurality of cylindrical drums including a first drum 22 and a plurality of succeeding drums 23, 24, and so on, within the limits of capacity of the shaft 13, the number of which may be increased if desired by elongating the machine in order to suit extreme conditions. Each of the drums comprises a coding drum having code protrusions thereon, in the instant case comprising a plurality of circumferentially extending, longitudinally spaced ridges 25 of progressively increasing length. For example, the first ridge counting from the left in Fig. 1 may have a length corresponding to one-tenth of the circumference of the drum, the succeeding ridge corresponding to two-tenths, and so on, up to the last ridge which may be a complete ridge. Thus, if the drum is rotatively positioned so that a sensing element moving longitudinally of the drum engages only one ridge during its complete traversal of the drum, the signaling mechanism associated therewith would transmit a signal corresponding to zero, indicating that the sensing element had contacted only the last ridge which would mean that the drum is located at the zero or 10 position. If the condition were actually at zero, all succeeding drums would create the same signal, whereas if the condition were actually at 10, 20, 30, or so on, the succeeding drums would transmit signals accordingly. It is to be appreciated that various electrical apparatus, such as disclosed in the above-identified patent, is associated with the present mechanism so as to transmit signals corresponding to the positions of the drums, and that the signals would be in the form of electrical impulses which may be transformed at a receiving station into audio or visual signals such as by actuating a buzzer, a blinker, a tape perforator or a printer. It is likewise to be appreciated that various means may be incorporated in or together with the present invention whereby measurements are transmitted periodically such as at every hour or every day at a certain time. The signaling apparatus may comprise an automatic wired or wireless transmitter, or the instrument may be arranged to transmit data when desired, such as by placing the instrument in a wired circuit including means to actuate the sensing mechanism when the circuit is closed, such as could be occasioned by lifting a telephone receiver, or by dialing a station number corresponding to the station of the particular instrument. It is to be appreciated that the signaling apparatus forms no part of the present invention. All that is required for an understanding of the present invention is to appreciate that, in accordance with the disclosure of the above-identified Stevens patent, a sensing element may be caused to traverse the coding drums and then return to a rest position, either periodically or selectively.

In accordance with the present invention the driving gear 15 drives a gear train including a second gear 26 fixed to a short shaft 27 suitably mounted parallel to shaft 13 and extending through the wall 11, the inner end of the shaft being fixed to a third gear 28 which meshes with a driven gear 29 fixed to and concentric with the first drum 22. The drum 22 is therefore driven in proportion to the measurable condition at a different speed from the speed of the shaft 13 depending upon the gear ratios involved. The succeeding drums are loosely mounted upon the shaft 13 and are only partially rotated a definite fraction of each revolution of the preceding drum by totalizing means to be described. By reason of this construction the contacting surfaces of the drums and the shaft 13 are constantly in relative movement whereby lubricant is constantly spread between the surfaces and the surfaces are prevented from sticking to each other. By constant motion it is, of course, meant that relative motion will occur as the condition changes. However, it will be apparent that any movement of the measuring mechanism will result in some degree of relative movement between the shaft 13 and each of the drums. The shaft 27 is spaced from the shaft 13, and the gears 15 and 26 are outside of the wall 11 whereby they are readily accessible and may be readily removed and replaced by a different set of meshing gears in order that the effect of rotation of the sheave 17 upon the drums may be varied. By reason of this construction the machine is readily adaptable to measure different units. For example, one set of gears may measure feet of change, while another set of gears may measure tenths of feet, and another set of gears may measure centimeters, and so on.

The first drum 22 is spaced from the wall 11 by means of a thin spacer sleeve 30 surrounding the intervening portion of the shaft 13, and the drums are all maintained in end-to-end relation by a setscrew collar 31 which may be loosened to permit withdrawal of the shaft 13 through the wall 11 whereby other drums may be placed on the shaft 13 within the limits of the instant machine. A disc 32 is fixed to the right end of each drum by suitable means such as a pair of pins 33, the disc being provided with a central aperture whereby it may be concentrically seated with respect to the drum by engagement with the exterior of a reduced concentric portion 34 integral with the drum. The left end of each succeeding drum is provided with a first reduced portion 35 of large diameter and a second reduced portion 36 of small diameter, the end of the portion 36 bearing against the surface of the portion 34 of the preceding drum to provide a spacer of minimum surface area, whereby the friction between drums is reduced to a minimum. A gear 37 is fixedly mounted on the portion 35 and projects therebeyond whereby a circumferential groove 38 is provided. A transfer pinion 39 is provided with a circumferential flange 40 which rides in the groove 38 in order to locate the transfer pinion longitudinally with respect to the adjacent drums, the pinion 39 being loosely mounted on a transfer pinion rod 41 extending longitudinally between the walls 11 and 12 in parallel relation to the shaft 13. The rod 41 is suitably mounted in journals whereby it may be withdrawn to permit placing of additional pinions 39 thereon if the number of drums is increased. The pinion 39 is provided with alternate, long teeth 42 and short teeth 43, all of which mesh with the teeth of the gear 37. A tongue 44 is struck outwardly from the disc 32 and is provided with a notch 45 in which the long teeth 42 may engage, but which is maintained beyond the ends of the short teeth 43. The arrangement is such that the transfer pinion 39 normally locks the succeeding drum against movement, but once for every revolution of the preceding drum the notch 45 engages one of the long teeth 42 and rotates the succeeding drum a definite fraction of a revolution. Thus, if the first drum is set to measure tenths of a unit, the second drum will measure complete units and the third drum will measure tens of units. The operation of the totalizer transfer mechanism is effective in either direction so that the machine may measure rising or falling stream levels, or other reversible or variable conditions.

Means to sense the data accumulated on the drums are provided in the form of a carriage 50 constructed of dielectric material and which is slidably guided between lower supporting and guiding bars 51 mounted in insulated journals 52 associated with the walls 11 and 12 and an upper contact bar 53 mounted in similar insulated journals 54 associated with the walls 11 and 12. One of the lower bars 51 and the upper bar 53 are connected to signaling mechanism including a relay 55 by suitable conductors (not shown). The circuit is closed by switch means 56 mounted on the carriage 50 and sensing means comprising a switch actuating roller 57 engageable with the surfaces of the drums, the roller being biased outwardly by spring means 58. The arrangement is such as to cause the switch to be closed to energize the electromagnet 55 when the roller 57 rides over one of the ridges 25, and to be opened when the spring 58 urges the roller outwardly into a space between ridges. The switch is maintained in circuit with the electromagnet by a contact pad 59 mounted on the lower surface of the carriage and engaging one of the bars 51 and a spring contact 60 mounted on the carriage and engaging the upper bar 53. The carriage may support a second switch 61 including a sensing element 62 adapted to engage a notched bar (not shown) or equivalent means extending parallel to the guide bars 51 whereby the instrument may send a station identification signal.

The carriage is caused to move through a cycle from a position of rest, as illustrated in Fig. 1, to a far remote position whereby the sensing roller 57 traverses the surfaces of all of the drums, and then to return to its position of rest, at each data transmitting period. Such means comprises an electric motor 65 mounted on the base 10 and having a worm gear 66 fixed to its shaft and meshing with a gear 67 mounted in a gear cage 68. A suitable gear train including gears 69 and 70, as well as other gears (not shown), driven by gear 67, drives a horizontally disposed driving sprocket 71 at a relatively slow speed so that the sensing element smoothly traverses the surfaces of the drum with sufficient intervals of time between closing of the signaling circuit to make the impulses distinguishable from each other. A sprocket chain 72 is trained about the driving sprocket 71 and an idler sprocket 73 at the opposite end of the guiding means for the carriage, and the sprocket chain comprises a driving pin 74 engaged in a transverse slot 75 in the bottom of the carriage 50. The slot 75 extends transversely from side to side of the carriage so that the pin may remain in engagement with the carriage while passing about the opposed sprockets. Suitable electric means including switches (not shown) associated with the gear train cause the carriage to move through a complete cycle and then to remain at its initial position of rest. A plate 84 mounted upon a standard 85 extends longitudinally beneath both flights of the sprocket chain 72 to prevent the intermediate portions of the chain from sagging to such an extent that the pin 74 might be disengaged from the slot 75.

Means are provided to protect the sensing roller 57 and the associated switch from damage as follows: It will be observed that the ends of the ridges 25 project above the normal surface of the drums and if the drums should be rotating during the longitudinal movement of the carriage, damage might result. Also, it is desirable to cause the sensing element to traverse the entire series of drums in a longitudinal direction as the drums were positioned at any given instant, whereby the rate of rise or fall of a water body or other rapidly changing condition may be calculated by timing the interval between two measurements. In order to arrest the drums, the first drum 22 is provided with a longitudinally projecting pin 76 which extends toward the wall 11, the pin being engageable with a vertical arresting pin 77 mounted upon a lever 78 extending transversely with respect to the shaft 13. The lever is maintained in operative position by a pivot 79 extending vertically between ears 80 mounted on the wall 11. The lever is urged outwardly from the wall by means of a coil spring 81 compressed between the lever and the wall and surrounding a limiting screw 82 passing through an elongated slot 83 in the lever. The lever has its free end projecting into the path of the end of the carriage 59 whereby the pin 77 is moved out of the path of the pin 76 when the carriage approaches the position of rest. The spring 81 swings the lever outwardly to position the pin 77 in the path of movement of the pin 76 as the carriage starts through its cycle, the pins cooperatively engaging to arrest the drums and hold them stationary during the time that the sensing roller 57 is traversing the surfaces of the drums.

Having illustrated and described a preferred embodiment of our invention, it should be apparent to those skilled in the art that the same permits of modification in arrangement and detail. We claim as our invention all such modifications as come within the true spirit and scope of the following claims.

We claim:

1. A machine of the character described comprising an elongated shaft, a plurality of drums rotatably mounted in end-to-end relation on said shaft, each of said drums having a plurality of longitudinally spaced, code protrusions thereon, means to rotate a first one of said drums in either direction in proportion to a fluctuating measurable condition, reversible totalizer means between each adjacent pair of drums whereby said first drum partially rotates the next adjacent drum a definite fraction of a revolution in either direction for each complete revolution of the first drum and so on progressively for each succeeding drum whereby said drums assume relative positions corresponding to the measurable condition at all times, means to signal a measurement comprising a carriage, carriage guiding means extending parallel to said shaft, a sensing element mounted on said carriage and engageable with the surfaces of said drums, means to move said carriage longitudinally of said guiding means to cause said sensing element progressively to traverse the surfaces of all of said drums in a longitudinal direction, and means operatively associated with said carriage to lock said drums against movement during the time that said sensing element traverses said drums comprising a lever engaged by said carriage and moved thereby to a position of inoperativeness between movements of said carriage, spring means moving said lever to an operative position when said carriage starts to move, and an abutment on said first drum engaged by said lever to arrest said drums which said sensing element traverses the surfaces of the drums.

2. A machine of the character described comprising an elongated shaft, a plurality of drums rotatably mounted in end-to-end relation on said shaft, each of said drums having a plurality of longitudinally spaced, code protrusions thereon, means to rotate a first one of said drums in either direction in proportion to fluctuations of a fluctuating measurable condition, reversible totalizer means between each adjacent pair of drums whereby said first drum partially rotates the next adjacent drum a definite fraction of a revolution in either direction for each complete revolution of the first drum and so on progressively for each succeeding drum whereby said drums assume relative positions corresponding to the measurable condition at all times, means to signal a measurement comprising a carriage, carriage guiding means extending parallel to said shaft, a sensing element mounted on said carriage and engageable with the surfaces of said drums, means to move said carriage longitudinally of said guiding means to cause said sensing element progressively to traverse the surfaces of all of said drums in a longitudinal direction, and means operatively associated with said carriage to lock said drums against movement during the time that said sensing element traverses said drums comprising a lever pivotally mounted adjacent said first drum in transverse relation to said shaft, cooperative means on said lever and said first drum which, when engaged, prevent rotation of said first drum, spring means urging said lever in a direction to cause engagement of said cooperative means, said carriage moving means being operative to move said carriage from a position of rest at which said sensing element is spaced from said drums through a complete cycle traversing said drums in one direction and then returning to said position of rest, and said lever including a portion engaged by said carriage to move said cooperative means out of engagement against the force of said spring means when said carriage approaches said position of rest.

References Cited in the file of this patent

UNITED STATES PATENTS

| | | |
|---|---|---|
| 852,743 | Stakes | May 7, 1907 |
| 1,638,417 | Sperry | Aug. 9, 1927 |
| 2,146,999 | Stevens | Feb. 14, 1939 |
| 2,239,094 | Harvey | Apr. 22, 1941 |
| 2,466,099 | Hansen | Apr. 5, 1949 |